(12) United States Patent
Vanormelingen et al.

(10) Patent No.: US 10,358,518 B2
(45) Date of Patent: Jul. 23, 2019

(54) PROCESS FOR THE PREPARATION OF NOVOLAC ALKYLPHENOL RESINS

(71) Applicant: SUMITOMO BAKELITE EUROPE N. V., Genk (BE)

(72) Inventors: Wouter Vanormelingen, Genk (BE); Bart Schoofs, Genk (BE); Tom De Smedt, Genk (BE)

(73) Assignee: SUMITOMO BAKELITE EUROPE N. V., Genk (BE)

( * ) Notice: Subject to any disclaimer, the term of this patent is extended or adjusted under 35 U.S.C. 154(b) by 0 days.

(21) Appl. No.: 15/755,704

(22) PCT Filed: Mar. 9, 2017

(86) PCT No.: PCT/EP2017/000315
§ 371 (c)(1),
(2) Date: Feb. 27, 2018

(87) PCT Pub. No.: WO2017/153050
PCT Pub. Date: Sep. 14, 2017

(65) Prior Publication Data
US 2019/0023829 A1    Jan. 24, 2019

(30) Foreign Application Priority Data

Mar. 9, 2016    (BE) .................................. 2016/0054

(51) Int. Cl.
| | | |
|---|---|---|
| *C08G 8/12* | (2006.01) | |
| *C08L 9/06* | (2006.01) | |
| *B60C 1/00* | (2006.01) | |
| *C08G 8/04* | (2006.01) | |
| *C08L 61/06* | (2006.01) | |
| *C08G 8/10* | (2006.01) | |
| *C08K 3/22* | (2006.01) | |
| *C08K 3/36* | (2006.01) | |
| *C08K 5/09* | (2006.01) | |
| *C08K 5/18* | (2006.01) | |
| *C08K 5/548* | (2006.01) | |
| *C08L 9/00* | (2006.01) | |
| *C08L 91/00* | (2006.01) | |
| *C08G 8/24* | (2006.01) | |

(52) U.S. Cl.
CPC .............. *C08G 8/12* (2013.01); *B60C 1/0016* (2013.01); *C08G 8/10* (2013.01); *C08G 8/24* (2013.01); *C08K 3/22* (2013.01); *C08K 3/36* (2013.01); *C08K 5/09* (2013.01); *C08K 5/18* (2013.01); *C08K 5/548* (2013.01); *C08L 9/00* (2013.01); *C08L 9/06* (2013.01); *C08L 61/06* (2013.01); *C08L 91/00* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 3,108,087 A | 10/1963 | Kirkpatrick et al. | |
| 5,736,619 A * | 4/1998 | Kane ..................... | C08G 77/42 525/393 |
| 2007/0060718 A1 * | 3/2007 | Juhue ..................... | C08G 8/10 525/480 |

FOREIGN PATENT DOCUMENTS

CN        104693679 A      6/2015

OTHER PUBLICATIONS

Prakash Mahanwar: "Phenolic Resins", Matunga, Mumbai 400 019, India; pp. 1-50—downloaded from http://www.ipiindia.org/materialstask=callelement&format=raw&item_id=939&element=cf0577f3-519f-4fe3-9d25-658179076aff&method=download.

* cited by examiner

*Primary Examiner* — Christopher M Rodd
(74) *Attorney, Agent, or Firm* — Balaram Gupta

(57) ABSTRACT

Process for the preparation of a novolac alkylphenol resin using a defined mixture of mono- and dialkylphenols, an aldehyde, and an acid catalyst. The mixture of mono- and dialkylphenols comprises 20 to 70 mol % mono-alkylphenols having an alkyl group of 1 to 18 carbon atoms, and 30 to 80 mol % of dialkylphenols having alkyl groups of 1 to 18 carbon atoms. The molar ratio of aldehyde in comparison to the mono- and dialkylphenol mixture is greater than or equal to 1. Novolac alkylphenol resins prepared according to this invention contain, of each individual starting material phenolic monomer component, less than 0.5 mass %, and in the best case, less than 0.1 mass % in comparison to the total obtained alkylphenol resin.

24 Claims, 2 Drawing Sheets

PROCESS FOR THE PREPARATION OF NOVOLAC ALKYLPHENOL RESINS

CROSS REFERENCE TO RELATED APPLICATIONS

This application is a national phase application of PCT Application No. PCT/EP2017/000315, filed Mar. 9, 2017, and published as International Publication No. WO 2017/153050 A1 on Sep. 14, 2017, and which claims priority to Belgian Patent Application No. BE2016/0054, filed Mar. 9, 2016; both of which are incorporated herein by reference in their entirety.

The current invention relates to novolac alkylphenol resins. More specifically, the invention concerns a process for the preparation of novolac alkylphenol resins with less than 0.5 mass % of each phenolic monomer component, and preferably less than 0.1 mass % free, unreacted residue, based on the total amount of obtained alkylphenol resin. The current invention also concerns the use of these resins as a tackifying resin for rubber applications, more specifically, car tyres.

Conventional novolac alkylphenol resins are typically prepared through a polymerisation reaction between alkylphenols and aldehydes, in the presence of an acid as a catalyst (see L. Pilato, Phenolic Resins—A Century of Progress, Springer 2010).

It is generally known that the molecular weight of novolac alkylphenol resins is determined by the molar ratio (MR) between the aldehyde and the alkylphenol. In order to obtain a number average molecular weight between 800 and 2000 g/mol, an excess alkylphenol is typically used and the aldehyde/alkylphenol MR varies between 0.7 and 0.9. This ratio leads to novolac alkylphenol resins with a softening point between 80 and 130° C.

Due to the nature of the polymerisation reaction, namely a step-growth polycondensation, and the use of a molar excess of alkylphenol, a certain percentage of unreacted, free alkylphenol monomers is left over after all the aldehyde has reacted. The statistical model drawn up by Borrajo et al (Polymer, Vol. 23, p 263-266 (1982)), for example, predicts for polycondensations with phenol and formaldehyde via the Stokemayer distribution, levels of free phenol of 11.6%, 6.5% and 3.0%, for molar ratios of respectively 0.7, 0.8 and 0.9.

Novolac alkylphenol resins are excellently suitable for use as tackifying resin, for rubber applications, particularly for the confection of car tyres or other rubber tyres. Tyres are produced by assembling various layers of rubber in a specific sequence and geometry, after which the layers are cross-linked with each other through the process of vulcanisation. In order to retain the geometry in the period between the assembly and the vulcanisation process, these different rubber layers should adequately adhere to each other, both initially as well as after a few days. However, layers of synthetic rubber generally do not adhere to each other, or do so only insufficiently. For this reason, tackifying resins are added to the rubber so that these layers obtain a sufficient amount of adhesive strength.

Several studies indicate that alkylphenols have an adverse impact on health and the environment. Consequently, there is a growing concern about the toxicity of alkylphenols in general and, more particularly, those of 4-(1,1,3,3-tetramethylbutyl) phenol (PTOP) and nonylphenol. Both are candidates for the list of "Substances of very high concern" (SVHC) under the REACH Regulation. There is therefore a growing demand amongst tyre manufacturers to reduce the quantity of free alkylphenol monomers in tackifiers as much as possible, preferably to less than 0.5 mass % and most preferentially less than 0.1 mass %, based on the total mass of novolac alkylphenol resin.

A drop in the content of free alkylphenol monomers shall also facilitate the processing of novolac alkylphenol resins, since it reduces the fumes of alkylphenol components in the factories in which they are used. This particularly applies to rubber applications, if vulcanisation is carried out at high temperatures.

It is generally known to those skilled in the art that the quantity of free alkylphenol monomers can be reduced by increasing the MR of aldehyde/alkylphenol to above the typical upper limit of 0.9. This however gives rise to novolac alkylphenol resins having a high molecular weight and a softening point greater than 130° C. Such novolac alkylphenol resins require a higher processing temperature when used as tackifying resins during the industrial production of rubber tyres, which is not desirable.

U.S. Pat. No. 6,326,453 B2 and EP 1 108 734 A1 describe a reduction in the quantity of free phenol monomers in novolac (alkyl) phenol resins through the use of organic phosphoric acids as a catalyst. However, this requires a significant amount of catalyst. In order to arrive at a quantity of free phenol below 1%, 60 mass % of catalyst relative to phenol is required. 10% of catalyst is required for a residual free phenol of around 2%. This reference also states that if the quantity of catalyst is reduced below 0.1 mol % relative to phenol, the reaction is no longer effective. In summary, it may be stated that the large quantity of required catalyst renders this process economically unviable.

JP 11-349655 A describes the preparation of novolac phenol-formaldehyde resins in a methanol solution under high pressure and temperature (15 MPa/250° C.), in order to obtain a content of 1% free phenol. However, this process is very difficult to implement on an industrial scale from the technical point of view, in view of the high pressure and temperature involved.

An article by Li Ziqiang (Mining and Metallurgy, Vol. 5, p 24-27, 1996) describes how the quantity of free phenol can be reduced from 18% to 5% by adding urea during the synthesis of phenolic resins. Although this is a significant reduction, the content of 5% of free monomers is still too high for use of such novolac alkylphenol resins. In addition, the addition of urea may have an adverse effect on the ultimate characteristics of the rubber mixture.

U.S. Pat. No. 7,488,784 B2 describes the production of novolac alkylphenol resins with less than 2%, or less than 1% of free alkylphenol monomers through the addition of 2 to 20 mass % of fatty acids relative to the total alkylphenol. In the examples described, the content of free alkylphenol monomer can be reduced to 0.7% in this manner. In this invention, an aldehyde/alkylphenol MR greater than 0.9 is used, which leads to the production of alkylphenol polymers with a high molecular weight. The addition of the fatty acids in the reaction ensures a lowering of the softening point of these high molecular resins to 85-105° C., similar to conventional novolac alkylphenol resins.

U.S. Pat. No. 4,167,540 A describes the use of novolac alkylphenol resins as tackifiers for rubber applications in which the alkylphenol resin is prepared from (a) a mixture of mono- and dialkyiphenols, (b) a component that is at least trifunctional in relation to formaldehyde, such as, for example, resorcinol, and (c) formaldehyde. The mixture of mono- and dialkyiphenols thereby contains a maximum of 30 mol % of dialkylphenol. The MR of the components (a) and (b) relative to (c) is between 1:1.1 and 1:0.8. The content of free alkylphenol monomers that is present in the alkylphenol resins prepared according to this invention is not mentioned.

At present, no working procedure has been described to produce novolac alkylphenol resins with less than 0.5 mass %, and preferably less than 0.1 mass % of free alkylphenol monomers in combination with a softening temperature of between 80-130° C., and a number average molecular weight of 800-2000 g/mol, with similar characteristics to conventional novolac alkylphenol resins for rubber applications.

The aim of this invention is to tackle the abovementioned disadvantages of the current state of technology related to the lowering of the content of free alkylphenol monomers in novolac alkylphenol resins. In particular, the technical problem underlying the present invention is to provide a process for the preparation of a novolac alkylphenol resin with a very low phenolic monomer content (particularly less than 0.5 mass % of each phenolic monomer component, and preferably less than 0.1 mass % of each phenolic monomer component with respect to total amount of obtained alkylphenol resin), while at the same time the obtained novolac alkylphenol resin has a softening temperature of from 80 to 130° C. (preferably from 90 to 120° C.) and a number average molecular weight of 800 to 2000 g/mol.

Another objective of this invention concerns the use of novolac alkylphenol resins prepared according to the process above, as a tackifying resin in rubber applications.

Another objective of this invention concerns the use of novolac alkylphenol resins prepared according to the above process in rubber formulations.

Another objective of this invention concerns rubber tyres that contain novolac alkylphenol resins prepared according to the process above.

The above problems are solved by providing the embodiments as defined in the claims.

In particular, there is provided a process for the preparation of a novolac alkylphenol resin that comprises the following steps:

(a) Providing a mixture of phenolic monomers comprising 20 to 70 mol %, based on the total amount of phenolic monomers, of chemical substances having the structural formula I

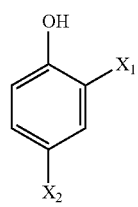

in which one of the groups $X_1$ or $X_2$ is a proton, and the remaining group X is a linear or branched alkyl group having 1 to 18 carbon atoms, and 30 to 80 mol %, based on the total amount of phenolic monomers, of chemical substances having the structural formula II

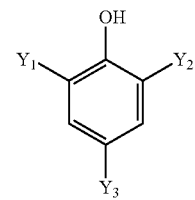

in which one of the groups $Y_1$, $Y_2$ and $Y_3$ is a proton, and the two remaining groups Y are, independent of each other, linear or branched alkyl groups having 1 to 18 carbon atoms;

(b) Adding an acid;

(c) Adding an aldehyde with the structural formula III

in which R is a proton or an alkyl group having 1 to 4 carbon atoms; wherein the molar ratio of the aldehyde with the structural formula III to the total amount of the chemical substances having the formula I and II is greater than or equal to 1.

The above process for the preparation of novolac alkylphenol resins advantageously results in resins with less than 0.5 mass % of each individual unreacted phenolic monomer falling under the structural formulas I or II with respect to the total alkylphenol resin. According to a preferred embodiment, the obtained alkylphenol resin contains less than 0.4 mass % of each individual unreacted phenolic monomer falling under the formulas I or II, based on the total amount of obtained alkylphenol resin, more preferably less than 0.3 mass %, more preferably less than 0.2 mass %, and most preferably less than 0.1 mass %.

Herein, the expression "phenolic monomer" relates to any compound falling within the scope of structural formulas I or II, particularly mono-alkylphenols and dialkylphenols.

According to a preferred embodiment, the total amount of unreacted phenolic monomer falling under the structural formulas I or II in the obtained alkylphenol resin is less than 1 mass %, based on the total amount of obtained alkylphenol resin, more preferable less than 0.7 mass %, more preferable less than 0.5 mass %, more preferable less than 0.3 mass %, and most preferable less than 0.1 mass %.

These resins can be obtained by using a defined mixture of mono- and dialkylphenols, an acid and an aldehyde.

The mono-alkylphenols have the structural formula I

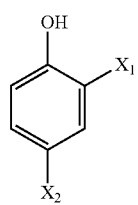

in which one of the groups $X_1$ or $X_2$ is a proton, and the remaining group X is a linear or branched alkyl group having 1 to 18 carbon atoms, and preferably 4 to 9 carbon atoms. 'Remaining group X' refers to $X_1$ or $X_2$ which is not a proton. For example, in case $X_1$ is a proton, the remaining group $X_2$ is a linear or branched alkyl group having 1 to 18 carbon atoms.

The dialkylphenols have the structural formula II

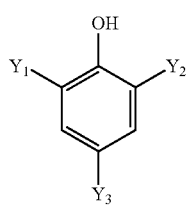

in which one of the groups $Y_1$, $Y_2$ and $Y_3$ is a proton, and the two remaining groups Y are, independent of each other, linear or branched alkyl groups having 1 to 18 carbon atoms, and preferably one or both of these groups Y have 4 to 9 carbon atoms. 'Remaining group Y' refers to $Y_1$, $Y_2$ or $Y_3$ which are not protons. For example, in case $Y_1$ is a proton, the remaining groups $Y_2$ and $Y_3$ are independently linear or branched alkyl groups having 1 to 18 carbon atoms.

The mixture of mono- and dialkylphenols comprises 20 to 70 mol % of mono-alkylphenols of the structural formula I and 30 to 80 mol % of dialkylphenols of the structural formula II, based on the total amount of mono- and dialkylphenols, and preferably 30 to 50 mol % of the no-alkylphenols and 50 to 70 mol % of the dialkylphenols.

The inventors found to their surprise, that when defined mixtures of alkylphenols, containing a high percentage of dialkylphenols, were used for the synthesis of novolac alkylphenol resins, novolac alkylphenol resins were obtained, containing an amount of each individual phenolic monomer falling under the structural formulas and I and II of less than 0.5 mass %, most preferable less than 0.1 mass %, relative to the total alkylphenol resin weight, while at the same time the obtained novolac alkylphenol resin has a softening temperature of from 80 to 130° C. and a number average molecular weight of 800 to 2000 g/mol. The content of undesirable, residual free alkylphenol monomers in this process is therefore lower than what conventional working procedures permit when producing novolac alkylphenol resins having a softening temperature of from 80 to 130° C. and a number average molecular weight of 800 to 2000 g/mol.

The molar ratio of aldehyde relative to mono- and dialkylphenol is greater than or equal to 1, and is preferably from 1.1 to 1.5. According to a preferred embodiment, the molar ratio is from 1.25 to 1.35. The most optimal molar ratio is about 1.3. The molar ratio of aldehyde/alkylphenols is calculated as follows:

$$MR = \frac{\text{mol aldehyde}}{\text{mol monoalkyphenol} + 0.5 * \text{mol dialkylphenol}}$$

The advantage of excess aldehyde is that the content of unreacted, free phenolic monomers is less than what is permitted by conventional procedures when producing novolac alkylphenolresins having a softening temperature of from 80 to 130° C. and a number average molecular weight of 800 to 2000 g/mol. A molar ratio higher than 1.5 may however be disadvantageous in view of the fact that a large quantity of unreacted aldehyde may be left behind after the reaction. This aldehyde may either remain in the final product, which is undesirable, or evaporate during distillation, which may reduce the yield.

According to a preferred embodiment of this invention, the composition of the phenolic monomer mixture comprises 30 to 50 mol % of chemical substances having the structural formula I and 50 to 70 mol % of chemical substances with structural formula II. This ratio allows the achievement of the lowest possible free monomer contents, combined with softening temperatures of the novolac alkylphenol resins in the preferred range of 90-120° C.

According to a preferred embodiment of this invention, the phenolic monomers having the structural formula I have a group X being a proton while the remaining group X represents an alkyl group having 4 to 9 carbon atoms. Moreover, the phenolic monomers having the structural formula II have preferably a group Y being a proton while one or both of the remaining groups Y independently represent an alkyl group having 4 to 9 carbon atoms. The advantage of this is the production of alkylphenol resins that are extremely similar to the current commercial resins in terms of molecular structure, and are composed of commercially available monomers, which have been proved to be adequately compatible with rubber.

The mono-alkylphenols having the structural formula I are preferably nonylphenol, p-tert-butylphenol (PTBP) or 4-(1,1,3,3-tetramethylbutyl) phenol (PTOP), or a mixture of at least 2 of the same. The use of a mixture of p-tert-butylphenol (PTBP) and 4-(1,1,3,3-tetramethylbutyl) phenol (PTOP) is particularly preferred. This leads to a sharp reduction of free phenolic monomer components in the novolac alkylphenol resins, in some cases to less than 0.1 mass %.

The preferred dialkylphenols having the structural formula II are xylenol, di-tert-butylphenol (di-TBP), di-(1,1,3, 3-tetramethylbutyl) phenol (di-TOP), tert-butyl-(1,1,3,3-tetramethylbutyl) phenol (TB-TOP), or di-nonylphenol, or a mixture of at least 2 of the same.

The desired mono- and dialkylphenol mixture can be prepared as is generally known to those skilled in the art, starting from phenol and olefins (alkenes) in proportions and under process conditions that promote the formation of dialkylphenols, in the presence of a Lewis acid, such as Amberlyst® 15 (Dow, MI). That is, the mono- and dialkylphenol mixture used in step a) of the process of the present invention can advantageously be prepared in a one-pot-synthesis using a Friedel-Crafts-alkylation, preferably directly in a suitable ratio of 20 to 70 mass % of monoalkylphenol and 30 to 80 mass % of dialkylphenol, and more preferably 30 to 50 mass % of monoalkylphenol and 50 to 70 mass % of dialkylphenol.

Alternatively, the desired mono- and dialkylphenol mixture can be prepared by mixing commercially available mono- and dialkylphenols or through a reaction of phenol and olefins, supplemented with commercially available mono- and dialkylphenols.

In the mono- and dialkylphenol mixture, other chemical substances that do not react with aldehydes can be added. For example, during the preparation of novolac alkylphenol resins according to this invention, water can be added in order to dissolve the acid or the aldehyde in the same. However, the addition of large quantities of water is not desirable, since this will slow down the reaction speed.

Moreover, during the preparation of novolac alkylphenol resins according to this invention, a solvent can also be added to improve the stirring characteristics of the mixture with novolac alkylphenol resins. The solvent can also be added to the novolac alkylphenol resins obtained, after production. For example, Xylene can be used as a solvent.

According to a preferred embodiment of the present invention, a non-alkylated phenolic monohydric or polyhydric monomer, such as phenol, resorcinol, bisphenol A, or bisphenol F, is added to the mixture of phenolic monomers in a ratio of from 0 to 30% by mass %, based on the total amount of components with structure I and II. On the other hand, these phenolic monomers may also be present in the mixture of structural formula I and II when alkylphenol monomers are not purified after the alkylation process. These non-alkylated phenolic monomers can improve the tackifying strength of the resin.

Each aldehyde of the general formula III, known for the preparation of conventional alkylphenol novolac resins, is suitable for the preparation of alkylphenol novolac resins according to the present invention.

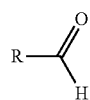

Examples of such aldehydes are, among others, formaldehyde, acetaldehyde, propionaldehyde and butyraldehyde. According to a preferred embodiment, aldehydes with a proton or an alkyl group with 1 carbon atom as the group R are used. For Example, the use of acetaldehyde has positive effects on the adhesive strength of the novolac alkylphenol resins produced and the use of formaldehyde is most preferred.

Formaldehyde can be used either as an aqueous solution or in the form of paraformaldehyde. According to a preferred embodiment, formaldehyde is used as an aqueous solution, since in this case a softening temperature of from 80° C. to 130° C. of the obtained novolac alkylphenol resin can be very reliably achieved. Moreover, an aqueous solution of formaldehyde is easy to handle.

In addition, aldehydes with the formula III can be obtained by using chemical substances that can decompose to aldehydes having the formula III. For example, the chemical substances which can decompose to aldehydes having the formula III can be selected from the group consisting of paraformaldehyde, paraldehyde, trioxane, furfural, hexamethylenetetramine, β-hydroxybutyraldelhyde, acetals such as methylformcel and butylformcel, and mixtures of at least 2 of the same. The advantage of the use of such chemical substances is that after the reaction, less water has to be distilled from the final product, and the production time is therefore shortened.

The acid (catalyst) added in step b) of the present invention can be any acid catalyst that is known to those skilled in the art. Suitable acids include, among others, mineral and organic acids, such as sulphuric acid, phosphoric acid, para toluene sulphonic acid, xylene sulfonic acid, dodecylbenzene sulfonic acid, oxalic acid or formic acid, or mixtures of at least two of such acids. The quantity of acid catalyst used mostly varies from 0.1 to 2%, preferably 0.5 to 1.5%, depending on the acid that is used and the mass of the alkylphenols.

According to a preferred embodiment of this invention, the acid used in step b) is oxalic acid. The advantage of this is that after the reaction, oxalic acid decomposes into volatile components that can be easily removed during the distillation at a temperature of above 140° C.

The preparation of novolac alkylphenol resins according to this invention is preferably carried out by combining a defined mixture of mono- and dialkylphenols with the acid catalyst, and thereafter adding the aldehyde.

The preparation of novolac alkylphenol resin according to this invention can also be carried out by mixing the acid and the aldehyde, and thereafter adding the same to the defined mono- and dialkylphenol mixture.

The preparation of novolac alkylphenol resin according to this invention can also be carried out by mixing the acid and the aldehyde, and for this purpose, gradually adding the pre-defined mono- and dialkylphenol mixture thereto.

The preparation of novolac alkylphenol resin according to the current invention can also be carried out by adding aldehyde to the defined mono- and dialkylphenol mixture, and thereafter mixing it with the acid. This preparation method is however the least advantageous, since a large quantity of heat is released during the addition of the acid to the aldehyde/mono- and dialkylphenol mixture, which can lead to catastrophic pressure development in the reaction medium.

The temperature at which the process of the present invention is carried out is not particularly limited. According to a preferred embodiment of the present invention, the process is carried out under reflux conditions.

In conventional novolac alkylphenol resin production procedures, the catalyst is in many cases neutralized after completion of the condensation reaction at 100° C., for example by adding an equivalent quantity of inorganic base such as sodium or potassium hydroxide solution, or lime or organic bases such as aqueous ammonia solution, triethanolamine, diethanolamine, tetrabutylammonium hydroxide or the like.

According to the present invention, it is preferred to carry out an atmospheric pressure distillation until a temperature of from 120° C. to 145° C., preferably of from 130° C. to 145° C., more preferably of from 140° C. to 145° C. and most preferably of about 145° C. is reached, without neutralizing the acid (i.e., the catalyst) beforehand, i.e. before the above temperature is reached. During this period, the remaining acidity and increased temperature will enable even sterically hindered ortho- or para-positions of the alkyl- or dialkylphenols to, react with remaining formaldehyde or benzylether groups (or some of the benzodioxane groups) that were produced as a sidereaction due to the use of excess formaldehyde in combination with weak acid catalysis (oxalic acid). This will advantageously reduce the amount of these unreacted alkyl- or dialkylphenols (i.e., phenolic monomers) to the desired ranges.

After this step, it is preferred that the acid is neutralized in the same way as in conventional resin preparation methods, i.e. for example by adding an equivalent quantity of inorganic base such as sodium or potassium hydroxide solution, or lime or organic bases such as aqueous ammonia solution, triethanolamine, diethanolamine, tetrabutylammonium hydroxide or the like.

Isolation of the condensation resins is thereafter preferably carried out by distilling off any remaining traces of volatile products present in the reaction mass, such as reaction water, by carrying out a distillation under a reduced pressure of preferably 100 mm Hg or less, more preferably 50 mm Hg or less, more preferably 25 mm Hg or less, and most preferably 15 mm Hg or less until a temperature in the range of 150° C. to 170° C., such as 155° C. to 165° C., or about 160° C. is reached. It is preferred to avoid increasing the temperature above that limit to avoid chain transfer reactions or other side reactions that could increase again the level of free alkyl or dialkylphenols. This distillation step is preferably executed to remove impurities and to obtain a final product with a softening point that is compatible with further applications.

In view of the above, the process of the present invention preferably comprises the following steps for processing the mixture after completion of a condensation reaction:
a step of distilling the mixture at atmospheric pressure until a temperature of from 120° C. to 145° C. is reached, without neutralizing the acid beforehand; after that, a step of neutralizing the acid; and
after that, a step of carrying out a distillation under a reduced pressure of 100 mm Hg or less, preferably 50 mm Hg or less, more preferably 25 mm Hg or less, and most preferably 15 mm Hg or less until a temperature of about 150° C. to 170° C. is reached.

The novolac alkylphenol resin prepared according to this invention has a number average molecular weight of 800-2000 g/mol and a softening temperature of from 80 to 130° C. This is similar to conventional novolac alkylphenol resins. However, novolac alkylphenol resins prepared according to this invention contain less than 0.5 mass % of each individual unreacted phenolic monomer falling under the formulas I and II, and in the best case, less than 0.1 mass %, which is lower than conventional novolac alkylphenol resins described in the current state of technology. Therefore, resins prepared according to the process of the present invention, which does not require large amounts of catalyst, high pressure and temperature, or the presence of fatty acids, are less toxic than state of the art resins having the same number average molecular weight and softening temperature.

Novolac alkylphenol resins prepared according to this invention can be used as tackifying resin in rubber applications. The advantage of this is that less alkylphenol fumes are released during the processing of the resin in the rubber applications than when conventional novolac alkylphenol resins are used, as described in the current state of technology.

An advantageous application of novolac alkylphenol resins prepared according to this invention concerns the use as tackifying resin for rubber tyres. More specifically, these resins can be used for the confection of rubber tyres in the automotive sector. The advantage of this is that less alkylphenol fumes are released during the processing of the resin in rubber tyres than when conventional novolac alkylphenol resins are used. In addition, the inventors found that the tan δ of a specific rubber mixture, which is directly related to the rolling resistance of a tyre based on such a rubber mixture and therefore the fuel consumption of a vehicle equipped with such tyres, was more favourable when using novolac alkylphenol resins prepared according to this invention, than if conventional novolac alkylphenol resins had been used, as described in the current state of technology.

Novolac alkylphenol resins prepared according to this invention can be used in rubber formulations that contain natural rubber, a synthetic rubber, or a mixture of the same. The advantage of these resins in comparison to conventional novolac alkylphenol resins is that fewer alkylphenol fumes are released during the processing of the rubber formulations. Moreover, advantageously fewer amounts of residual alkylphenols, which are known to be harmful to the aquatic environment, are released upon use, wear or recycling (such as after grinding rubber tyres and using the rubber particles as injury protection layer on artificial grass football fields) of rubber tyres according to the present invention.

An advantageous application of novolac alkylphenol resins prepared according to this invention concerns the use in rubber formulations that contain natural rubber, a synthetic rubber, or a mixture of the above, in which the novolac alkylphenol resins are present in a ratio of 1 to 7 parts by weight per 100 parts by weight of rubber. The advantage of this is that the rubber obtains adequate adhesive properties, without the other rubber properties being affected too greatly.

Another advantageous application of this invention concerns rubber tyres containing novolac alkylphenol resins prepared according to this invention. The advantage of the use of these resins in rubber tyres is that due to the lower content of free phenolic monomers, the production is safer for the workers than if conventional novolac alkylphenol resins are used as described in the current state of technology.

EXAMPLES

Figure 1:
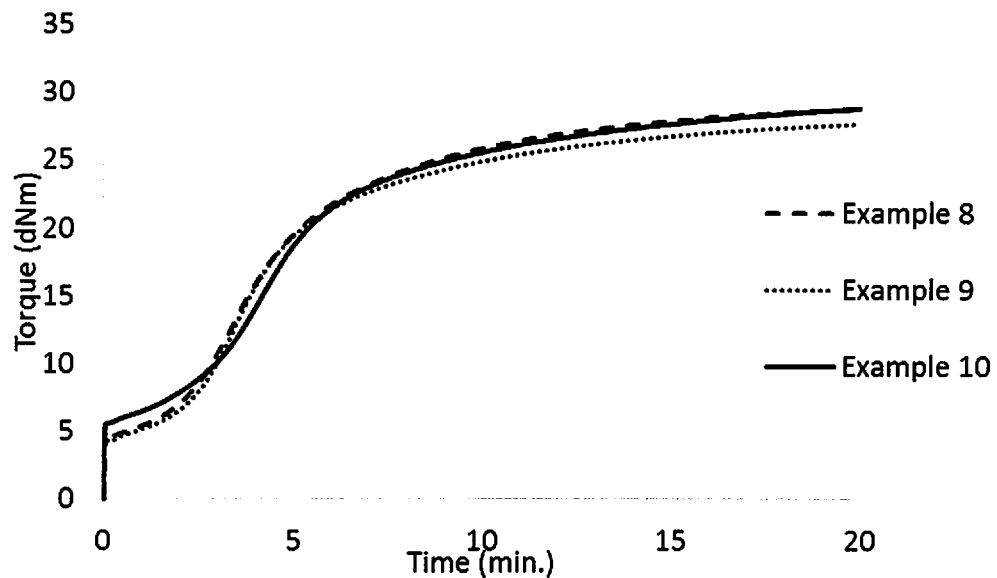
FIG. 1 shows the vulcanisation behaviour of rubber formulations that contain tackifying resins prepared according to the current invention, in comparison to the vulcanisation behaviour of rubber formulations that use conventional tackifying resins.

The following procedure can apply as a general procedure for alkylphenol novolac resins according to the current invention, without thereby wanting to limit the possible combinations of process parameters.

500 g phenolic monomers, 5.35 g of oxalic acid and 10.7 g of water are weighed into a three-liter flask. After the mixture is heated to 95° C., 139.8 g of formaldehyde (50% in water) is added dropwise over 120 minutes. During this addition, the released reaction heat causes a rise in temperature up to reflux, after which the mixture is maintained at reflux. The mixture is maintained at reflux for 2.5 hours, after which an atmospheric distillation is commenced. Upon reaching a temperature of 140° C., the mixture is kept at this temperature until the oxalic acid has essentially completely decomposed into volatile products. Any remaining traces of acid can at this point be neutralized with a suitable base such as triethanolamine. Then, a switchover is made to a vacuum distillation at 15 mm Hg, and as soon as the mixture reaches 160° C. and full vacuum is reached, the hot mixture is poured into a metal pan. After cooling down, a light yellow solid substance is obtained.

In examples 1 and 2 (comparative), and 3 to 7 (according to the present invention), the following different mixtures of mono- and dialkylphenols are used for the preparation of novolac alkylphenol resins. Examples 3 to 7 were prepared according to the previously mentioned general procedure, in which the following compositions of phenolic monomers were used:

TABLE 1

Composition of the alkylphenol mixtures used for the preparation of the novolac alkylphenol resins, for examples 1-7

| alkylphenol mixtures used in example | mol % PTOP | mol % PTBP | mol % di-TBP | mol % di-TOP | mol % TB-TOP |
|---|---|---|---|---|---|
| 1 | 100 | 0 | 0 | 0 | 0 |
| 2 | 100 | 0 | 0 | 0 | 0 |
| 3 | 50 | 0 | 50 | 0 | 0 |
| 4 | 60 | 0 | 40 | 0 | 0 |
| 5 | 33.5 | 19.8 | 6.1 | 15.8 | 24.8 |
| 6 | 43.9 | 16.6 | 4.7 | 15.2 | 19.6 |
| 7 | 51.3 | 14.2 | 3.7 | 14.9 | 15.9 |

A small fraction of the previously mentioned monomer mixtures consist of impurities, such as residual olefins and oligomers of the same, or unreacted phenol, which do not contribute to the mole percentage as defined above. The content of free, unreacted residue of phenolic monomers is determined for each novolac alkylphenol resin, prepared with the previously mentioned phenolic monomer mixtures. Table 2 clearly shows that the addition of dialkylphenols to the polymerisation reaction results in a drop in free, unreacted phenolic monomers in comparison to the conventional procedure, to below 0.5 mass %, and in the best case, to below 0.1 mass %. N/A means not available.

Determination of the Softening Point

The softening points were determined according to the standard procedure with Ring&Ball, as described in ISO 4625-1:2004.

Free PTOP Determination

The quantity of free PTOP in resins was determined by gas chromatography, using a Shimadzu GC-2014 platform with an injector, a Phenomenex Zebron SE 30 packed column, a Flame Ionization Detector and software for recording and integration of the chromatogram. The samples were prepared in the following manner: 0.5 g of resin and 0.3 g of m-cresol—used as an internal standard—were weighed into a 125 ml beaker and 100 ml of acetone was added to this. The response coefficient was determined by analysing PTOP/m-cresol standards under the same conditions.

Determination of Free PTBP

The quantity of free PTBP in resins was determined with gas chromatography using a Shimadzu GC-2014 platform with an injector, a Phenomenex Zebron SE 30 packed column, an FID detector and software for recording and integration of the chromatogram. The samples were prepared in the following manner: 0.5 g of resin and 0.3 g of m-cresol—used as an internal standard—were weighed into a 125 ml beaker and 100 ml of acetone was added to this. The response coefficient was determined by including PTBP/m-cresol standards under the same conditions.

Determination of the Number Average Molecular Weight ($M_n$)

The number average molecular weights were determined using gel permeation chromatography (GPC), calibrated with polystyrene standards. The GPC used is a Hitachi Chromaster, equipped with an injector system, tetrahydrofuran as a solvent, a flow rate of 1.0 ml/min., an Agilent 5 µm PLgel column, thermostated at 35° C., and a refractive index detector. Toluene was used as an internal standard. The samples were prepared by dissolving 60 mg of resin in 4 ml of tetrahydrofuran with 0.02% toluene Determination of the Composition of the Alkylphenol Mixtures The percentages of di-tert-butylphenol (di-TBP), di-(1,1,3,3-tetramethylbutyl) phenol (di-TOP) and tert-butyl-(1,1,3,3-tetramethylbutyl) phenol (TB-TOP) of the alkylphenol mixtures were determined using a gas chromatograph linked to a mass spectrometer. The system used is an Agilent 5977A GC-MS. The GC-MS was calibrated with commercially available compounds, PTOP, PTBP and di-tert-butylphenol. m-Cresol was used as internal standard.

TABLE 2

Examples of alkylphenol/formaldehyde resins prepared according to the conventional method (examples 1 and 2) and according to the current invention (examples 3 to 7).

| Example | Mol % of dialkylphenols (compared to total monoalkyl + dialkylphenols) | Molar ratio of formaldehyde/ alkylphenols | $M_n$, g/mol (PDI) | R&B, ° C. | m % free PTOP | m % free PTBP | m % free di-TBP | m % free di-TOP | m % free TB-TOP |
|---|---|---|---|---|---|---|---|---|---|
| 1 | 0 | 0.73 | 918 (1.42) | 99.3 | 3.65 | N/A | N/A | N/A | N/A |
| 2 | 0 | 0.81 | 1155 (1.44) | 114.6 | 1.45 | N/A | N/A | N/A | N/A |
| 3 | 50 | 1.30 | 1038 (1.45) | 106.9 | <0.1 | N/A | 0.30 | N/A | N/A |
| 4 | 40 | 1.20 | 1255 (1.51) | 117.4 | <0.1 | N/A | 0.22 | N/A | N/A |
| 5 | 46.7 | 1.36 | 1256 (1.65) | 100.6 | <0.1 | <0.1 | <0.1 | <0.1 | <0.1 |
| 6 | 39.5 | 1.31 | 1483 (1.71) | 110.9 | <0.1 | <0.1 | <0.1 | <0.1 | <0.1 |
| 7 | 34.5 | 1.29 | 1694 (1.72) | 120.4 | <0.1 | <0.1 | <0.1 | <0.1 | <0.1 |

Another objective of the invention concerns the use of the novolac resins prepared according to this invention as tackifying resin in rubber applications, in particular, for the confection of rubber tyres in the automotive sector. Apart from adhesion promotion, other characteristics of tackifying resins are also important in rubber applications, including vulcanisation behaviour, mechanical characteristics such as hardness and tensile strength, and tan δ. The latter parameter quantifies the energy absorption by the rubber and is directly proportional to the rolling resistance of the tyre. An increase in the molecular weight of the tackifying resins leads to an increase in tan δ of the rubber mixture. Since the tan δ is directly proportional to the energy consumption of the vehicle, a low tan δ is desirable.

The characteristics of a rubber formulation that contains a novolac alkylphenol resin prepared according to the current invention (example 8) were tested and compared with the characteristics of a rubber formulation that includes a conventional tackifying resin (example 9) and with the characteristics of a rubber formulation that does not contain tackifying resin (example 10). The novolac alkylphenol resin used in example 8 is prepared according to the procedure of example 5.

For the tests, use was made of a rubber formulation that is typical for the tread of a vehicle tyre and is based on the patent EP0501227 B1. This formulation consists of two steps and is as follows:

- 103.1 phr (parts per hundred) S-SBR NS460 sold by Zeon, under the trade name Nipol with 25% bonded styrene and a Mooney viscosity of 49 (ML-4 at 100° C.)
- 25.0 phr of butadiene rubber available from Lanxess under the trade name Buna ND 22 EZ with a high cis-content (>96%) and a Mooney viscosity of 63 (ML-4 at 100° C.)
- 80.0 phr of silica as a filler sold by Evonik under the trade name Ultrasil 7000GR with a specific surface area of 175 m$^2$/g as per ISO 9277
- Aromatic oil sold by H&R Group under the trade name Vivatec 500
- 2.5 phr of zinc oxide
- 2.0 phr of stearic acid
- 2.0 phr of anti-aging and anti-ozone additive N-(1,3-dimethyl butyl)-N'-phenyl-p-phenylenediamine (6PPD)
- 10.0 phr of silane bis-[3-(triethoxysilyl)-propyl]-tetrasulfane sold as a coupling agent by Kettlitz under the trade name Silanogran Si69/GR70
- 5.0 phr of tackifier according to the current invention (example 8) or 5.0 phr of conventional tackifier with a softening point of 100° C. sold by SBHPP under the trade name DUREZ® 19900 (example 9) or 0.0 phr of tackifier (example 10)

This basic mixture is blended in a Banbury mixer and the speed of the rotors and the start temperature are adjusted in such a manner that the temperature at the end of the mixing cycle is around 150° C. A mixing cycle starts at 100° C., and typically continues for about 10 minutes. In a first phase, the S-SBR and butadiene rubber is kneaded, and thereafter the silica, the aromatic oil, the silane and the tackifying resin are added to it. Thereafter, zinc oxide, stearic acid and 6PPD are added to the mixture and the mixture is kneaded for 1 minute. Thereafter, the rubber mixture is taken from the Banbury mixer and immediately calendered on rolls of 20° C. After the rubber slabs have rested for 24 hours, 1.5 phr of sulphur, 1.7 phr of the accelerator, N-cyclohexyl-2-benzithiazyl sulfonamide (CBS), and 2.0 phr of the accelerator diphenyl guanidine (DPG) are mixed with the rubber by calendaring, using a roll temperature set point of 30° C.

A comparison between examples 8, 9 and 10 was made regarding: mechanical characteristics, vulcanisation behaviour, adhesion promotion, and tan δ. The Shore A hardness is measured according to ISO 7619-1, the tensile modulus, tensile strength and elongation at break according to DIN 53504 and the compression set as per DIN ISO 815-1. The vulcanisation curves are measured with a Rubber Process Analyzer (RPA) according to DIN 53529. The adhesive strength is measured according to ISO 11339 1, 3, 4 and 5 days after the calendering of the rubber mixtures. The tan δ is measured in function of the amplitude at 60° C. and a frequency of 1 Hz with sample dimensions 40×10×2 mm in line with DIN 53513 and DIN 53535.

The results for the mechanical characteristics are summarised in Table 3 and indicate that the samples with tackifying resin according to the current invention behave in a similar manner to samples with conventional tackifying resin.

TABLE 3

Mechanical characteristics of vulcanised rubber mixtures without tackifying resin, with conventional tackifying resin or tackifying resin prepared according to the current invention.

| Mixture | Example 10 | Example 9 | Example 8 |
|---|---|---|---|
| Shore A hardness | 69 | 69 | 71 |
| Tensile modulus, MPa | 3.2 | 2.6 | 2.5 |
| Tensile strength, MPa | 16.9 | 16.0 | 14.7 |
| Elongation at break, % | 408 | 421 | 405 |
| Compression set (25%, 24 hours at 70° C.), % | 15.6 | 22.9 | 20.8 |

The results for vulcanisation behaviour are found in FIG. 1. This shows that the samples with tackifying resin according to the current invention behave similar to samples with conventional tackifying resin.

Figure 2:
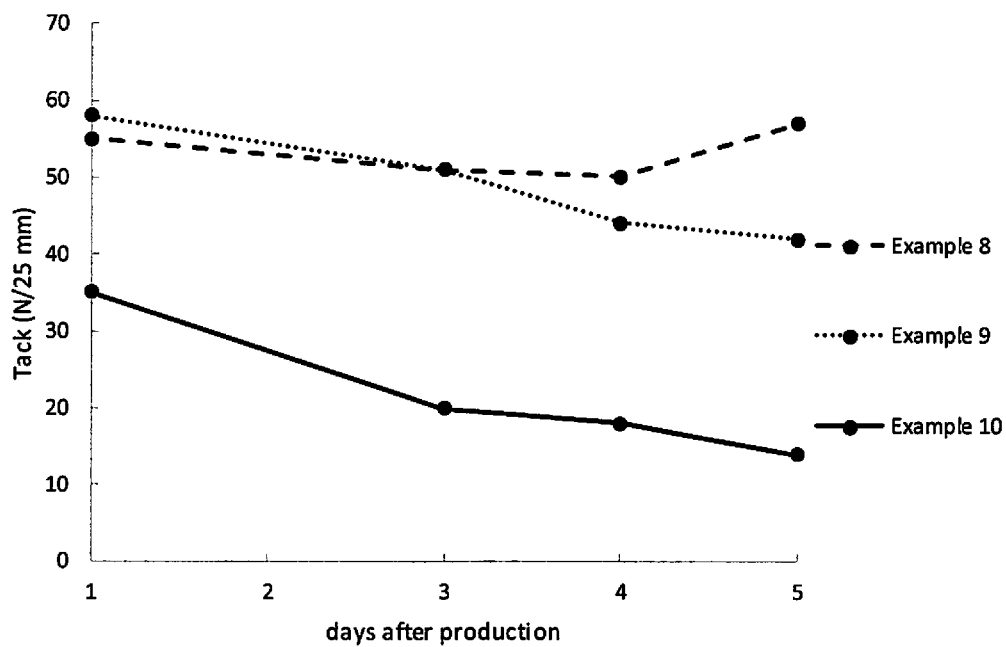
FIG. 2 shows the adhesive strength of rubber formulations that contain tackifying resins prepared according to the current invention, in comparison to the adhesive strength of rubber formulations that use conventional tackifying resins.

The results for adhesive strength are found in FIG. 2. This shows that the tackifying resin as per the current invention promotes adhesion of the rubber at least as well as conventional tackifying resin, and that there is no decrease in adhesive strength up to five days after the production date of the rubber mixture.

Figure 3:
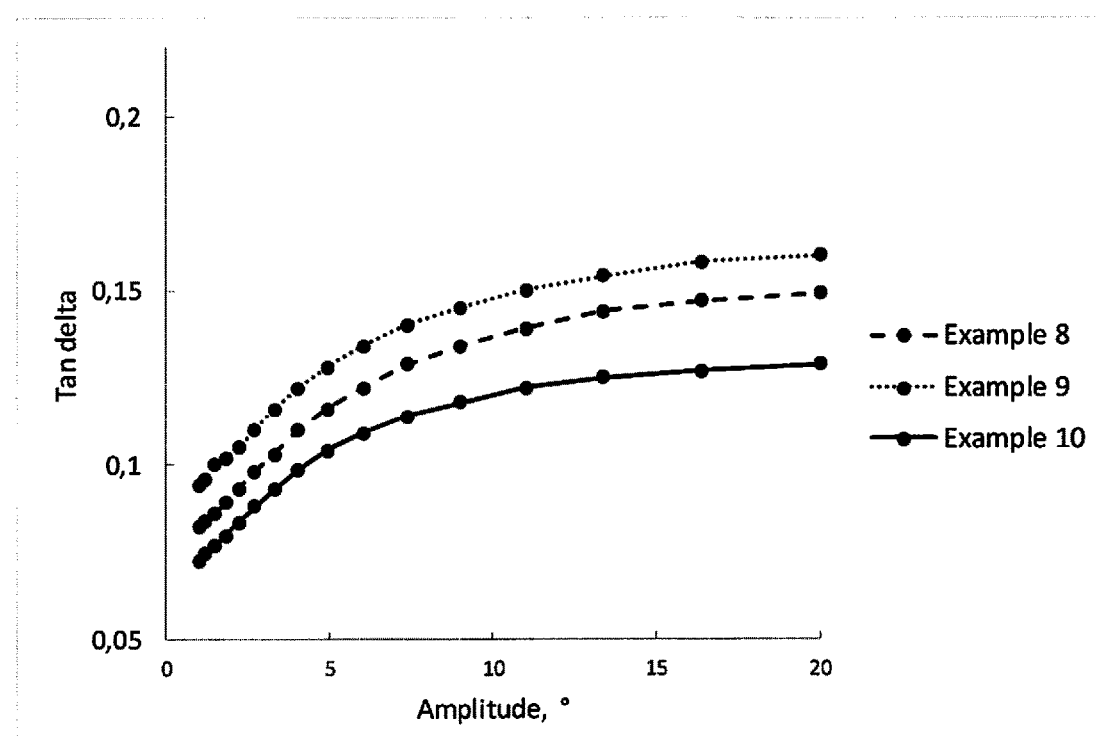
FIG. 3 shows the tan δ of a rubber formulation that contains a tackifying resin prepared according to the present invention, in comparison to the tan δ of a rubber formulation that uses a conventional tackifying resin (and a rubber formulation not containing a tackifying resin).

The results for tan δ are found in FIG. 3. This shows that the tan δ for the sample with a tackifying resin of the current invention are lower than for samples with a conventional tackifying resin. It is therefore to be expected that the rolling resistance of the tyres shall be lower if the resins according to this invention are used.

The novolac alkylphenol resins of the current invention therefore exhibit characteristics identical to those of conventional tackifying resins in terms of adhesive characteristics, vulcanisation behaviour and mechanical characteristics, and even an improvement in tan δ, and also have a lower content of free, unreacted alkylphenol monomers. As a result, they can be a viable alternative to conventional tackifying resins in rubber applications, and rubber formulations, with the advantage that less harmful alkylphenol components are released during the use of the resins.

The invention claimed is:
1. A process for the preparation of a novolac alkylphenol resin that comprises the following steps:
  (a) providing a mixture of phenolic monomers comprising 20 to 70 mol %, based on the total amount of phenolic monomers, of chemical substances having the structural formula I

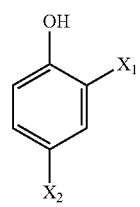

I in which one of the groups $X_1$ or $X_2$ is a proton, and the remaining group X is a linear or branched alkyl group having 1 to 18 carbon atoms, and 30 to 80 mol %, based on the total amount of phenolic monomers, of chemical substances having the structural formula II

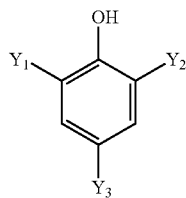

in which one of the groups $Y_1$, $Y_2$ and $Y_3$ is a proton, and the two remaining groups Y are, independent of each other, linear or branched alkyl groups having 1 to 18 carbon atoms;
(b) adding an acid;
(c) adding an aldehyde with the structural formula III

in which R is a proton or an alkyl group having 1 to 4 carbon atoms; wherein the molar ratio of the aldehyde with the structural formula III to the total amount of the chemical substances having the formula I and II is greater than or equal to 1.

2. The process according to claim 1, wherein the obtained novolac alkylphenol resin contains less than 0.5 mass % of each individual unreacted phenolic monomer falling under the structural formulas I and II, based on the total amount of novolac alkylphenol resin.

3. The process according to claim 1, wherein the obtained novolac alkylphenol resin contains less than 0.1 mass % of each individual unreacted phenolic monomer falling under the structural formulas I and II, based on the total amount of novolac alkylphenol resin, and less than 1 mass % total unreacted phenolic monomers falling under the structural formulas I and II, based on the total amount of novolac alkylphenol resin.

4. The process according to claim 1, wherein the molar ratio of the aldehyde with the structural formula III to the total amount of the chemical substances having the formula I and II is greater than or equal to 1.1.

5. The process according to claim 1, wherein the molar ratio of the aldehyde with the structural formula III to the total amount of the chemical substances having the formula I and II is from 1.1 to 1.5.

6. The process according to claim 1, wherein the molar ratio of the aldehyde with the structural formula III to the total amount of the chemical substances having the formula I and II is from 1.25 to 1.35.

7. The process according to claim 1, wherein the mixture of phenolic monomers comprises 30 to 50 mol % of chemical substances having the structural formula I and 50 to 70 mol % of chemical substances having the structural formula II.

8. The process according to claim 1, wherein the remaining group X of the chemical substances having the structural formula I which is not a proton is a linear or branched alkyl group having 4 to 9 carbon atoms.

9. The process according to claim 1, wherein one or both of the remaining groups Y of the chemical substances having the structural formula II which are not a proton are independently a linear or branched alkyl group having 4 to 9 carbon atoms.

10. The process according to claim 1, wherein the chemical substance having the formula I is selected from the group consisting of nonylphenol, p-tert-butylphenol (PTBP), 4-(1,1,3,3-tetramethylbutyl) phenol (PTOP) and the mixtures of at least two of the same.

11. The process according to claim 1, wherein the chemical substance having the formula I is a mixture of p-tert-butylphenol (PTBP) and 4-(1,1,3,3-tetramethylbutyl) phenol (PTOP).

12. The process according to claim 1, wherein the chemical substance having the structural formula II is selected from the group consisting of xylenol, di-nonyl phenol, di-tert-butylphenol (di-TBP), di-(1,1,3,3-tetramethylbutyl) phenol (di-TOP), tert-butyl-(1,1,3,3-tetramethylbutyl) phenol (TB-TOP)), and the mixtures of at least two of the same.

13. The process according to claim 1, wherein apart from components having the formula I, II and III, a non-alkylated phenolic monohydric or polyhydric monomer such as phenol, resorcinol, bisphenol A, or bisphenol F is added in a ratio of 0-30% by mass %, based on the total amount of components having the structure I and II.

14. The process according to claim 1, wherein the acid is oxalic acid.

15. The process according to claim 1, wherein the group R of the aldehyde with the structural formula III is a proton or an alkyl group with 1 carbon atom.

16. The process according to claim 1, wherein the aldehyde is formaldehyde, which is used as an aqueous solution.

17. The process according to claim 1, wherein the aldehyde having the structural formula III is obtained by adding chemical substances that can decompose into similar aldehydes, the chemical substances that can decompose being selected from the group consisting of paraformaldehyde, paraldehyde, trioxane, furfural, hexamethylenetetramine, β-hydroxybutyraldehyde, acetals such as methylformcel and butylformcel, and mixtures of at least 2 of the same.

18. The process according to claim 1, wherein a solvent is added during the preparation.

19. The process according to claim 1, wherein a solvent is added to the obtained novolac alkylphenol resins.

20. The process according to claim 1,
further comprising the following steps for processing the mixture after completion of a condensation reaction:
a step of distilling the mixture at atmospheric pressure until a temperature of about 120° C. to 145° C. is reached, without neutralizing the acid beforehand;
after that, a step of neutralizing the acid; and
after that, a step of carrying out a distillation under a reduced pressure of 100 mm Hg or less until a temperature of about 150° C. to 170° C. is reached.

21. A novolac alkylphenol resin obtained by the process according to claim 1, wherein the novolac alkylphenol resin has a number average molecular weight of 800 to 2000 g/mol, a softening temperature of from 80 to 130° C., and less than 0.5 mass % of each phenolic monomer component having the structural formula I and II, based on the total amount of novolac alkylphenol resins.

22. A rubber formulation containing a natural rubber, a synthetic rubber, or a mixture of the two, and the novolac alkylphenol resin according to claim 21.

23. The rubber formulation according to claim 22, wherein the novolac alkylphenol resin is present in a ratio of 1 to 7 parts by weight per 100 parts by weight of rubber.

24. A rubber tyre containing a novolac alkylphenol resin according to claim 21.

* * * * *

(12) EX PARTE REEXAMINATION CERTIFICATE (11863rd)
United States Patent
Vanormelingen et al.

(10) Number: US 10,358,518 C1
(45) Certificate Issued: Jun. 16, 2021

(54) PROCESS FOR THE PREPARATION OF NOVOLAC ALKYLPHENOL RESINS

(71) Applicant: SUMITOMO BAKELITE EUROPE N. V., Genk (BE)

(72) Inventors: Wouter Vanormelingen, Genk (BE); Bart Schoofs, Genk (BE); Tom De Smedt, Genk (BE)

Reexamination Request:
No. 90/014,577, Sep. 16, 2020

Reexamination Certificate for:
Patent No.: 10,358,518
Issued: Jul. 23, 2019
Appl. No.: 15/755,704
PCT Filed: Mar. 9, 2017
PCT No.: PCT/EP2017/000315
§ 371 (c)(1),
(2) Date: Feb. 27, 2018
PCT Pub. No.: WO2017/153050
PCT Pub. Date: Sep. 14, 2017

(30) Foreign Application Priority Data

Mar. 9, 2016 (BE) .................. 2016/0054

(51) Int. Cl.
| | |
|---|---|
| *C08G 8/12* | (2006.01) |
| *B60C 1/00* | (2006.01) |
| *C08G 8/10* | (2006.01) |
| *C08G 8/24* | (2006.01) |
| *C08K 3/22* | (2006.01) |
| *C08K 3/36* | (2006.01) |
| *C08K 5/09* | (2006.01) |
| *C08K 5/18* | (2006.01) |
| *C08K 5/548* | (2006.01) |
| *C08L 9/00* | (2006.01) |
| *C08L 9/06* | (2006.01) |
| *C08L 61/06* | (2006.01) |
| *C08L 91/00* | (2006.01) |

(52) U.S. Cl.
CPC .............. *C08G 8/12* (2013.01); *B60C 1/0016* (2013.01); *C08G 8/10* (2013.01); *C08G 8/24* (2013.01); *C08K 3/22* (2013.01); *C08K 3/36* (2013.01); *C08K 5/09* (2013.01); *C08K 5/18* (2013.01); *C08K 5/548* (2013.01); *C08L 9/00* (2013.01); *C08L 9/06* (2013.01); *C08L 61/06* (2013.01); *C08L 91/00* (2013.01); *C08L 2205/03* (2013.01)

(58) Field of Classification Search
None
See application file for complete search history.

(56) References Cited

To view the complete listing of prior art documents cited during the proceeding for Reexamination Control Number 90/014,577, please refer to the USPTO's public Patent Application Information Retrieval (PAIR) system under the Display References tab.

*Primary Examiner* — Jerry D Johnson

(57) ABSTRACT

Process for the preparation of a novolac alkylphenol resin using a defined mixture of mono- and dialkylphenols, an aldehyde, and an acid catalyst. The mixture of mono- and dialkylphenols comprises 20 to 70 mol % mono-alkylphenols having an alkyl group of 1 to 18 carbon atoms, and 30 to 80 mol % of dialkylphenols having alkyl groups of 1 to 18 carbon atoms. The molar ratio of aldehyde in comparison to the mono- and dialkylphenol mixture is greater than or equal to 1. Novolac alkylphenol resins prepared according to this invention contain, of each individual starting material phenolic monomer component, less than 0.5 mass %, and in the best case, less than 0.1 mass % in comparison to the total obtained alkylphenol resin.

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 4 and 15-17 are cancelled.

Claims 1 and 20-24 are determined to be patentable as amended.

Claims 2-3, 5-14, 18 and 19, dependent on an amended claim, are determined to be patentable.

New claims 25-28 are added and determined to be patentable.

1. A process for the preparation of a novolac alkylphenol resin that comprises the following steps:

(a) providing a mixture of phenolic monomers comprising 20 to 70 mol %, based on the total amount of phenolic monomers, of chemical substances having the structural formula I

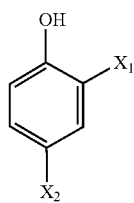

in which one of the groups $X_1$ or $X_2$ is a proton, and the remaining group X is a linear or branched alkyl group having 1 to 18 carbon atoms, and 30 to 80 mol %, based on the total amount of phenolic monomers, of chemical substances having the structural formula II

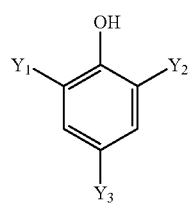

in which one of the groups $Y_1$, $Y_2$ and $Y_3$ is a proton, and the two remaining groups Y are, independent of each other, linear or branched alkyl groups having 1 to 18 carbon atoms;

(b) adding an acid;

(c) adding an aldehyde with the structural formula III

in which R is a proton[or an alkyl group having 1 to 4 carbon atoms], *and which is used exclusively as an aqueous solution thereof as the only aldehyde reactant in the process*; wherein the molar ratio of the aldehyde with the structural formula III to the total amount of the chemical substances having the formula I and II is greater than or equal to [1.] *1.1, and wherein the method further comprises the following steps for processing the mixture after completion of a condensation reaction: a step of distilling the mixture at atmospheric pressure until a temperature of about 120° C. to 145° C. is reached, without neutralizing the acid beforehand; after that an optional step of neutralizing the acid; and after that, a step of carrying out a distillation under a reduced pressure of 100 mm Hg or less until a temperature of about 150° C. to 170° C. is reached.*

20. The process according to claim 1, further comprising the following [steps] *step* for processing the mixture after completion of a condensation reaction:

[a step of distilling the mixture at atmospheric pressure until a temperature of about 120° C. to 145° C. is reached, without neutralizing the acid beforehand;] after [that,] *the step of distilling the mixture and before the step of carrying out a distillation under a reduced pressure,* a step of neutralizing the acid[; and after that, a step of carrying out a distillation under a reduced pressure of 100 mm Hg or less until a temperature of about 150° C. to 170° C. is reached].

21. [A novolac alkylphenol resin obtained by the process according to claim 1] *The process according to claim 1*, wherein the novolac alkylphenol resin has a number average molecular weight of 800 to 2000 g/mol, a softening temperature of from 80 to 130° C., and less than 0.5 mass % of each phenolic monomer component having the structural formula I and II, based on the total amount of novolac alkylphenol resin.

22. [A] *The process according to claim 21, further comprising adding a* rubber formulation containing a natural rubber, a synthetic rubber, or a mixture of the two, and the novolac alkylphenol resin[according to claim 21].

23. The [rubber formulation] *process* according to claim 22, wherein the novolac alkyphenol resin is present in a ratio of 1 to 7 parts by weight per 100 parts by weight of rubber.

24. [A rubber tyre containing a] *The process according to claim 21, wherein the* novolac alkylphenol resin [according to claim 21] *is contained in a rubber tyre*.

25. *A process for the preparation of a novolac alkylphenol resin that comprises*

*the following sequential steps:*

(a) *providing a mixture of phenolic monomers comprising 20 to 70 mol %, based on the total amount of phenolic monomers, of chemical substances having the structural formula I*

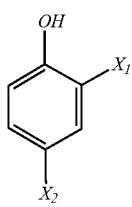

in which one of the groups $X_1$ or $X_2$ is a proton, and the remaining group X is a linear or branched alkyl group having 1 to 18 carbon atoms, and 30 to 80 mol %, based on the total amount of phenolic monomers, of chemical substances having the structural formula II

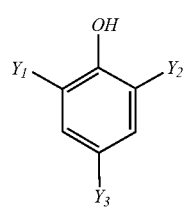

in which one of the groups $Y_1$, $Y_2$ and $Y_3$ is a proton, and the two remaining groups Y are, independent of each other, linear or branched alkyl groups having 1 to 18 carbon atoms;
(b) adding an acid;
(c) adding an aldehyde with the structural formula III

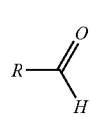

in which R is a proton, and wherein the aldehyde is added exclusively as an aqueous formaldehyde solution as the only aldehyde reactant in the process; wherein the molar ratio of the aldehyde with the structural formula III to the total amount of the chemical substances having the formula I and II is greater than 1.1, and wherein the method further comprises the following sequential steps after step (c) for processing the mixture after completion of a condensation reaction:
(d) a step of distilling the mixture at atmospheric pressure until a temperature of about 120° C. to 145° C. is reached, without neutralizing the acid beforehand;
(e) after that, a step of neutralizing the acid; and
(f) after that, a step of carrying out a distillation under a reduced pressure of 100 mm Hg or less until a temperature of about 150° C. to 170° C. is reached and, wherein the obtained novolac alkylphenol resin contains less than 0.5 mass % of each individual unreacted phenolic monomer falling under the structural formulas I and II, based on the total amount of novolac alkylphenol resin, and wherein the obtained novolac alkylphenol resin has a number average molecular weight of 800 to 2000 g/mol and a softening temperature of from 80 to 130° C.

26. The process according to claim 25, wherein the obtained novolac alkylphenol resin contains less than 0.1 mass % of each individual unreacted phenolic monomer falling under the structural formulas I and II, based on the total amount of novolac alkylphenol resin, and less than 1 mass % total unreacted phenolic monomers falling under the structural formulas I and II, based on the total amount of novolac alkylphenol resin.

27. The process according to claim 25, wherein the molar ratio of the aldehyde with the structural formula III to the total amount of the chemical substances having the formula I and II is from 1.25 to 1.5.

28. A process for the preparation of a novolac alkylphenol resin that consists of the following steps:
(a) providing a mixture of phenolic monomers comprising 20 to 70 mol %, based on the total amount of phenolic monomers, of chemical substances having the structural formula I

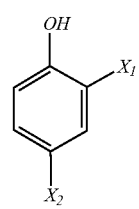

in which one of the groups $X_1$ or $X_2$ is a proton, and the remaining group X is a linear or branched alkyl group having 1 to 18 carbon atoms, and 30 to 80 mol %, based on the total amount of phenolic monomers, of chemical substances having the structural formula II

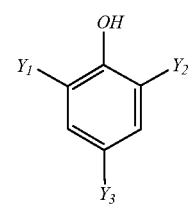

in which one of the groups $Y_1$, $Y_2$ and $Y_3$ is a proton, and the two remaining groups Y are, independent of each other, linear or branched alkyl groups having 1 to 18 carbon atoms;
(b) adding an acid;
(c) adding an aldehyde with the structural formula III

in which R is a proton, and which is used exclusively as an aqueous solution thereof; wherein the molar ratio of the aldehyde with the structural formula III to the total amount of the chemical substances having the formula I and II is greater than or equal to 1.1, and wherein the method further comprises the following steps for processing the mixture after completion of a condensation reaction: a step of distilling the mixture at atmospheric pressure until a temperature of about 120° C. to 145° C. is reached, without neutralizing the acid beforehand; after that an optional step of neutralizing the acid; and after that, a step of carrying out a distillation under a reduced pressure of 100 mm Hg or less until a temperature of about 150° C. to 170° C. is reached, wherein the obtained novolac alkylphenol resin has a number average molecular weight of 800 to 2000 g/mol and a softening temperature of from 80 to 130° C.

* * * * *